— US005570014A

United States Patent [19]
Müller et al.

[11] Patent Number: 5,570,014
[45] Date of Patent: Oct. 29, 1996

[54] METHOD AND APPARATUS FOR TESTING THE POSITION OF A POINT ON EDITED MAGNETIC TAPES PACKED IN CASSETTES VIA A CUETONE

[75] Inventors: Andreas Müller, Gütersloh; Manfred Klar, Bielefeld; Bernd Hofer, Verl, all of Germany

[73] Assignee: Sonopress Produktionsgesellschaft für Ton- und Informationsträger mbH, Gütersloh, Germany

[21] Appl. No.: 403,425

[22] Filed: Mar. 14, 1995

[30] Foreign Application Priority Data

Mar. 24, 1994 [DE] Germany ............................ 44 10 279.8

[51] Int. Cl.$^6$ ............................ G01B 7/04; G11B 3/90; G11B 27/36
[52] U.S. Cl. ............................ 324/206; 369/53; 360/31
[58] Field of Search ............................ 324/206, 210, 324/211, 212, 207.24, 207.11; 360/15, 31, 72.2, 50, 74.6, 74.4, 25; 369/53, 58; 242/534; 364/562, 569; 250/566, 570

[56] References Cited

U.S. PATENT DOCUMENTS

| | | | |
|---|---|---|---|
| 3,764,896 | 10/1973 | Manders | 324/206 |
| 3,997,123 | 12/1976 | King | 242/531.1 |
| 4,466,029 | 8/1984 | Tanaka | 360/72.2 |
| 4,570,876 | 2/1986 | Andoh et al. | 360/74.6 X |
| 4,578,644 | 3/1986 | Farrow | 324/212 X |
| 4,974,785 | 12/1990 | Woodley et al. | 242/531.1 |
| 5,446,605 | 8/1995 | Umehara et al. | 360/74.6 |
| 5,450,247 | 9/1995 | Schwab | 360/17 |

Primary Examiner—Sandra L. O'Shea
Assistant Examiner—Roger Phillips
Attorney, Agent, or Firm—Henry M. Feiereisen

[57] ABSTRACT

A method of testing the position of an edit point between an edited magnetic tape packed in a cassette and a leader spliced ahead of the recording or a trailer spliced after the recording, includes determination of a distance of the edit point from a cue tone situated, for example, at least before the beginning of the recording, or from the end of the recording and generating first and second output signals commensurate with an optical measurement of the edit point and an inductive measurement of the recorded cue tone. In dependence of the position of the recorded cue tone behind the leader or ahead of the trailer as viewed in tape travel direction, a time difference, such as, between the ascending flank of the second output signal and the descending flank of the first output signal, is determined. The determined time difference is then compared with upper and lower limits which define a tolerance range for the position of the edit point before or behind the recorded cue tone. In case, the determined time difference and thus the position of the edit point is situated, for example, outside the tolerance range in the recorded cue tone, error messages are generated which are displayed and converted into signals for readjusting or shutting down the tailoring and winding machine.

15 Claims, 10 Drawing Sheets tape cut at 1.3 cm tape cut between 1.3 cm and 15.6 cm tape cut between 15.6 cm and 96.5 cm no $S_C$ within $t_{VC,max}$

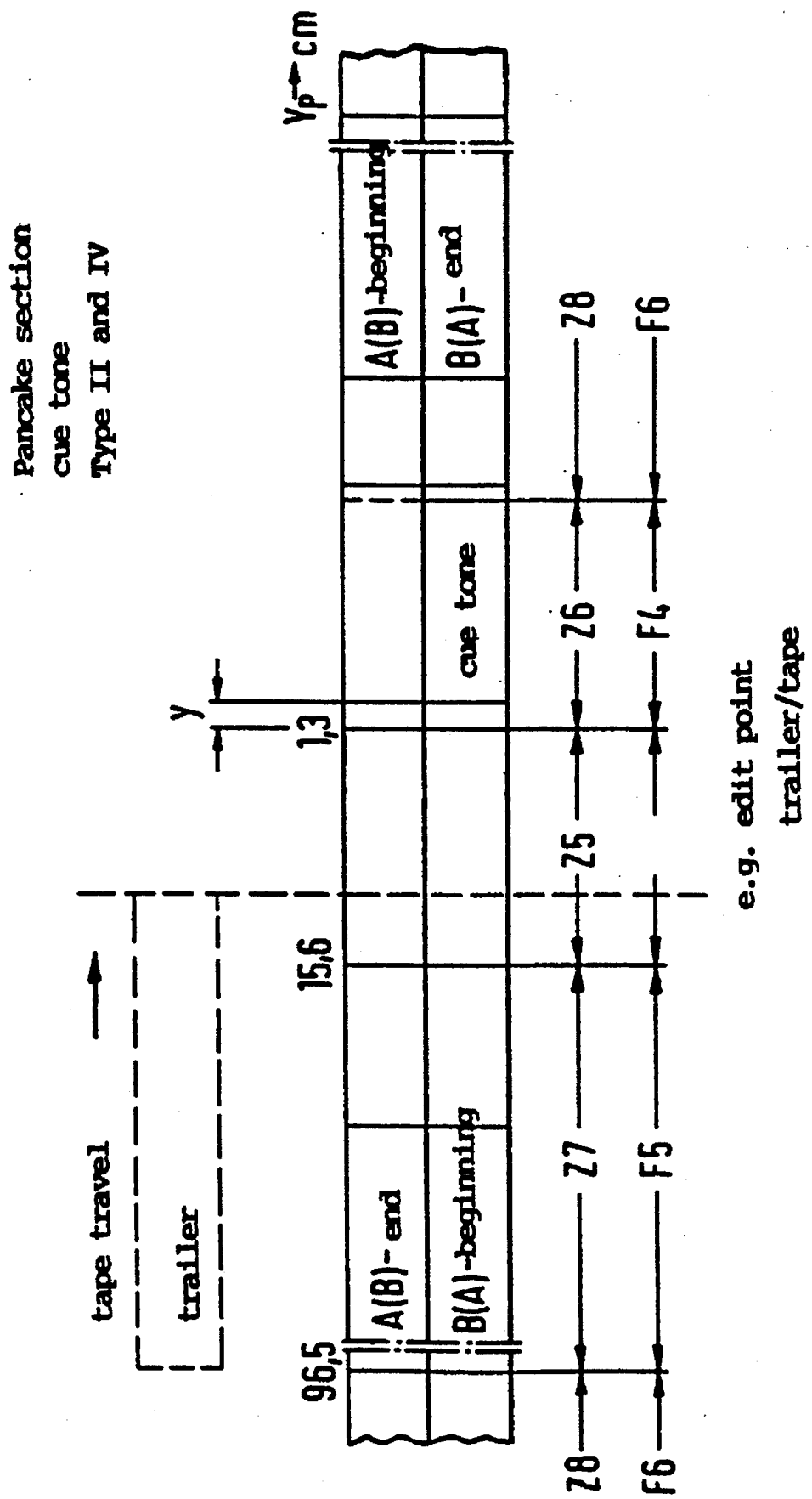

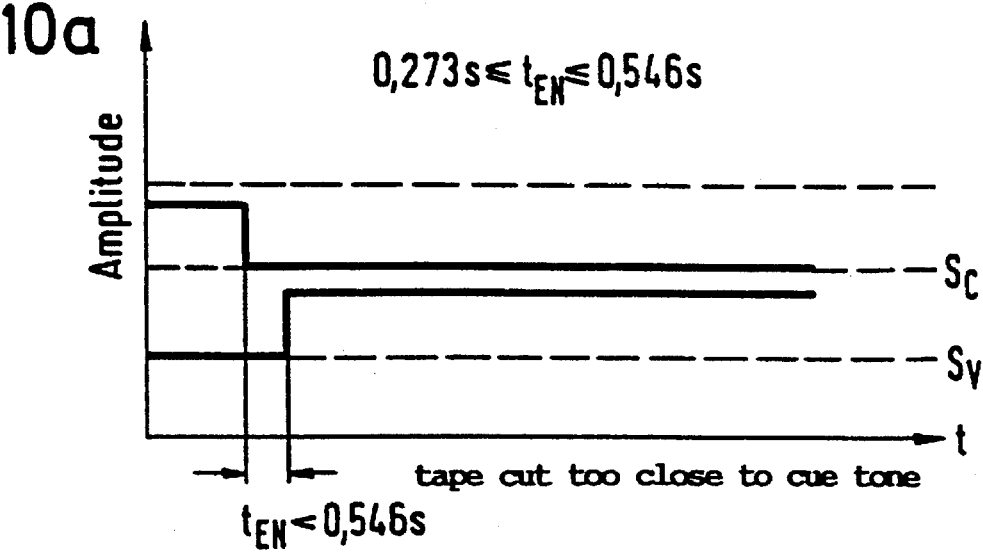
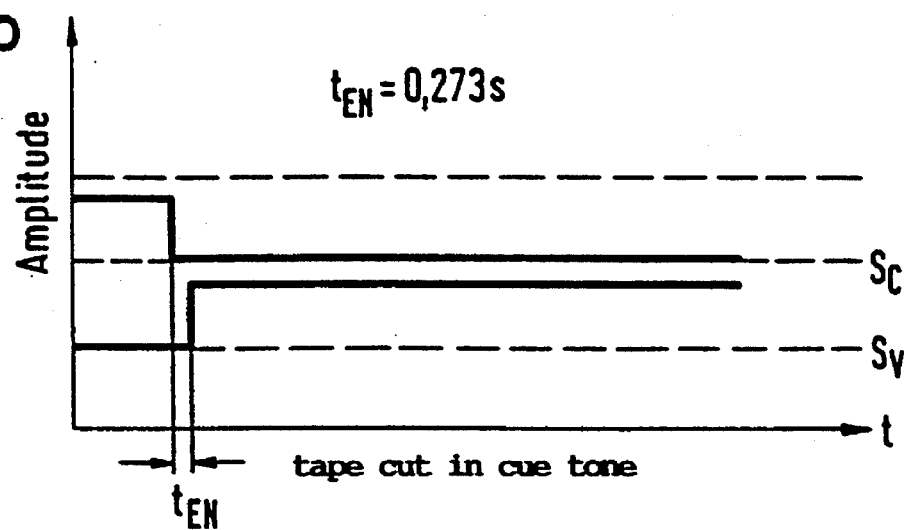
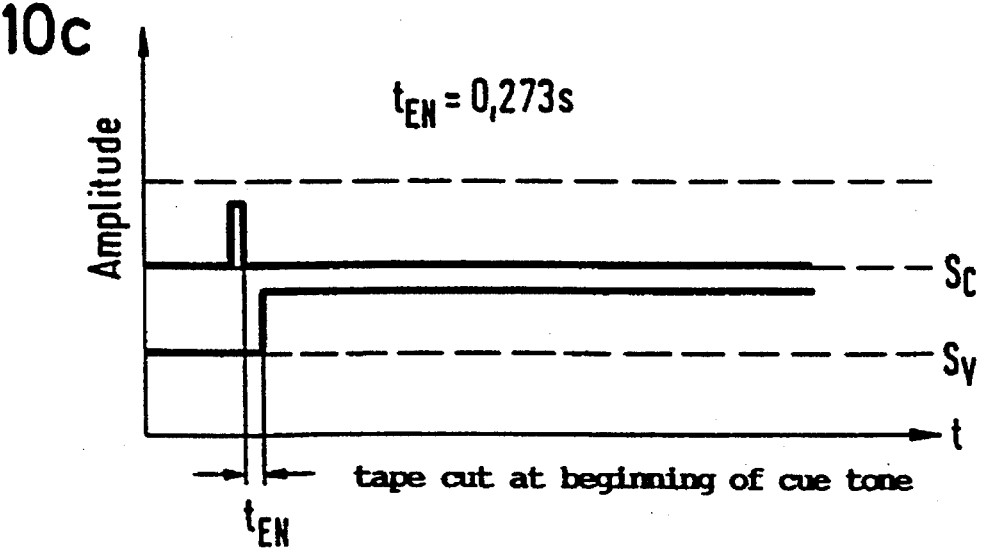

METHOD AND APPARATUS FOR TESTING THE POSITION OF A POINT ON EDITED MAGNETIC TAPES PACKED IN CASSETTES VIA A CUETONE

BACKGROUND OF THE INVENTION

The present invention refers to a method of testing the position of an edit point or cut between a magnetic tape impressed with a recording and packed in a cassette (MC or DCC) and a leader spliced ahead of the recording or a trailer spliced after the recording through playback of the cassette and determination of the distance of the edit point from either a cue tone located at least before the beginning of the recording or from the beginning of the recording, or from a cue tone located at least behind the end of the recording or from the end of the recording, with the magnetic tape being played back for conducting the testing operation at standard speed normal for magnetic tape cassettes. The present invention refers also to an apparatus for carrying out this method.

For reproducing analogous or digital data information, such as for example music scores, on magnetic tape cassettes, the information is recorded initially in multiple sequence onto a long tape wound on a supply reel (tape pancake). Thus, each duplicated tape pancake contains a series of copy recordings of a master, separated by the 6Hz cue tone. The pauses between identical successive recordings are of a same length, however, may vary from manufacturer to manufacturer between about 10 to 20 seconds. The length of the supply reel ranges between about 3,500 to 7,020 m, with a cue tone being recorded in the pauses between successive recordings. By means of the recorded cue tone, the tape machine used for packing the tape pancake into the empty cassette shells sets the edit point between identical recordings upon the supply reel.

Four different positions designated I, II, III or IV are currently utilized during production of recorded magnetic tape cassettes for impressing the cue tone with variable distance to the recorded data information. In analog as well as digital recording, the tape is split in two halves (A-side and B-side) which upon recordation in analog fashion includes two tracks, and upon recordation in digital fashion includes nine tracks. The A-side and the B-side are recorded and played back in opposite tape travel directions, with the cue tone being impressed over the entire width of the respective A-side or B side i.e. on both tracks at analogous recordation, or on all nine tracks at digital recordation. At standard speed, i.e. 4.76 cm/s of the magnetic tape, the frequency of the cue tone is 6 Hz. The timed length of the recorded cue tone amounts at the standard speed of 4.76 cm/s typically to between about 2 and 3 seconds. The position I for the recorded cue tone is located on the B-side before the beginning of the B-side. The position II for the recorded cue tone, as used during production of DCC, is situated on the A-side before its end. In the position III, the recorded cue tone is recorded on the A-side before its beginning and in the position IV, the cue tone is recorded on the B-side before its end.

In general, cassettes packed with edited magnetic tapes are controlled by a tester through randomly picking samples from a plurality of cassettes made in the tailoring and winding machine. These randomly picked samples are checked in the area of the recorded cue tone as to whether the edit point or cut with the leader or trailer is outside the recording or within the recording. Until an error can be detected in this manner, the entire edited batch (about 2,000 to 5,000 magnetic tape cassettes) is generally processed so that the entire production cannot be shipped when an editing error is detected. Theoretically, the ensuing high reject rate during production of recorded magnetic tape cassettes could be reduced by increasing the number of testing personnel and tape machines to enable an error detection during packing edited tapes into empty cassettes before the production end. However, the testing operation becomes prohibitively expensive and uneconomical.

SUMMARY OF THE INVENTION

It is an object of the present invention to provide an improved method for testing the position of an edit point on magnetic tapes tailored and packed in cassettes, obviating the afore-stated drawbacks.

In particular, it is an object of the present invention to provide an improved method for testing the position of an edit point of edited magnetic tapes packed into cassettes, by which the reject rate is drastically reduced at lower cost for the testing operation.

It is yet another object of the present invention to provide an apparatus for carrying out the method according to the present invention.

These objects and others which will become apparent hereinafter are attained in accordance with the present invention by generating a first output signal commensurate with an optical measurement of the edit point and by generating a second output signal commensurate with an inductive measurement of the recorded cue tone, determining in dependence of the position of the recorded cue tone behind the leader or before the trailer, as viewed in tape travel direction, either the time difference between the ascending flank of the second output signal and the descending flank of the first output signal, or the time difference between the ascending flank of the first output signal and the descending flank of the second output signal, comparing the determined time differences with upper and lower limits which define a tolerance range for the time difference and thus for the position of the edit point before or after the recorded cue tone, as viewed in tape travel direction, and generating error messages when either one of the time differences and thus the position of the edit point is situated outside the tolerance range in the recorded cue tone, or before the tolerance range, or behind the tolerance range or behind or before the recorded cue tone.

Suitably, the error messages are optically displayed and converted into signals by which the tailoring and winding process is interrupted or readjusted. Cassettes being checked are randomly picked, e.g. each thirtieth cassette, and automatically transferred into the tape machine during continued tailoring and winding.

In accordance with the present invention, the method is carried out by an apparatus which includes a light barrier for generating a first output signal in response to the position of the edit point, a special read head for generating a second output signal in response to a detection of a cue tone, a microprocessor by which the first and second output signals are processed and evaluated to control a MC (musicassette) or DCC (digital compact cassette) tape drive in accordance with a preset program, and a display unit which is operatively connected to the microprocessor for indicating the result of the signal processing.

In accordance with the present invention, the measurement of the position of the edit point between the trailer or leader and the magnetic tape relative to the position of the recorded cue tone is randomly carried out, in a rapid and essentially automatic manner. The time difference determined between the position of the recorded cue tone and the position of the tape edit point (that is the position of the splice between the leader and the trailer, on the one hand, and the magnetic tape, on the other hand) is compared with upper and lower limit values which define a tolerance range. A measurement within this tolerance range indicates a sufficient distance of the edit point to the beginning or the end of the recording on the magnetic tape so that a complete score is recorded on the edited magnetic tape and no recordings belonging to previous or subsequently packed cassettes are contained.

The tailoring and winding process runs as long as the measured values are within the tolerance range. In case, the measured values lie outside the tolerance range, particular error signals are generated by which the tailoring and winding process is immediately readjusted or interrupted and the error signals are qualitatively displayed to inform the operator about the necessary readjustment of the tailoring and winding machine in order to rapidly resume the operation in a simple manner without requiring a time consuming renewed determination of the parameter for the process.

The method according to the present invention can thus be utilized in an advantageous manner on-line in a conventional tailoring and winding process. Alternatively, the method according to the present invention may also run separate from the tailoring and winding process, however parallel thereto, with one operator manually interrupting the process when one of the error messages are displayed in order to execute the necessary readjustment.

Preferably, the apparatus for carrying out the method according to the invention is a tape machine which is separate from the tailoring and winding machine and retrofitted in accordance with the present invention. Preferably, the tape machine is connected via an interface to the tailoring and winding machine in order to control it on-line, and stores data for the tolerance range and the error messages with regard to the different positions I, II, III and IV of the recorded cue tone in a memory. A display of the tape machine indicates the error messages.

BRIEF DESCRIPTION OF THE DRAWING

The above and other objects, features and advantages of the present invention will now be described in more detail with reference to the accompanying drawing in which:

FIG. 8 is a schematic illustration of positions II and IV of the recorded cue tone relative to the splice of the magnetic tape with the trailer;

FIGS. 9a, 9b, 10a, 10b 11a 11b and 12 are graphical illustrations of time-dependent amplitudes in accordance with FIG. 8, illustrating various scenarios of the time difference between detected output signals commensurate with the recorded cue tone and the edit point.

DETAILED DESCRIPTION OF PREFERRED EMBODIMENTS

Figure 1:
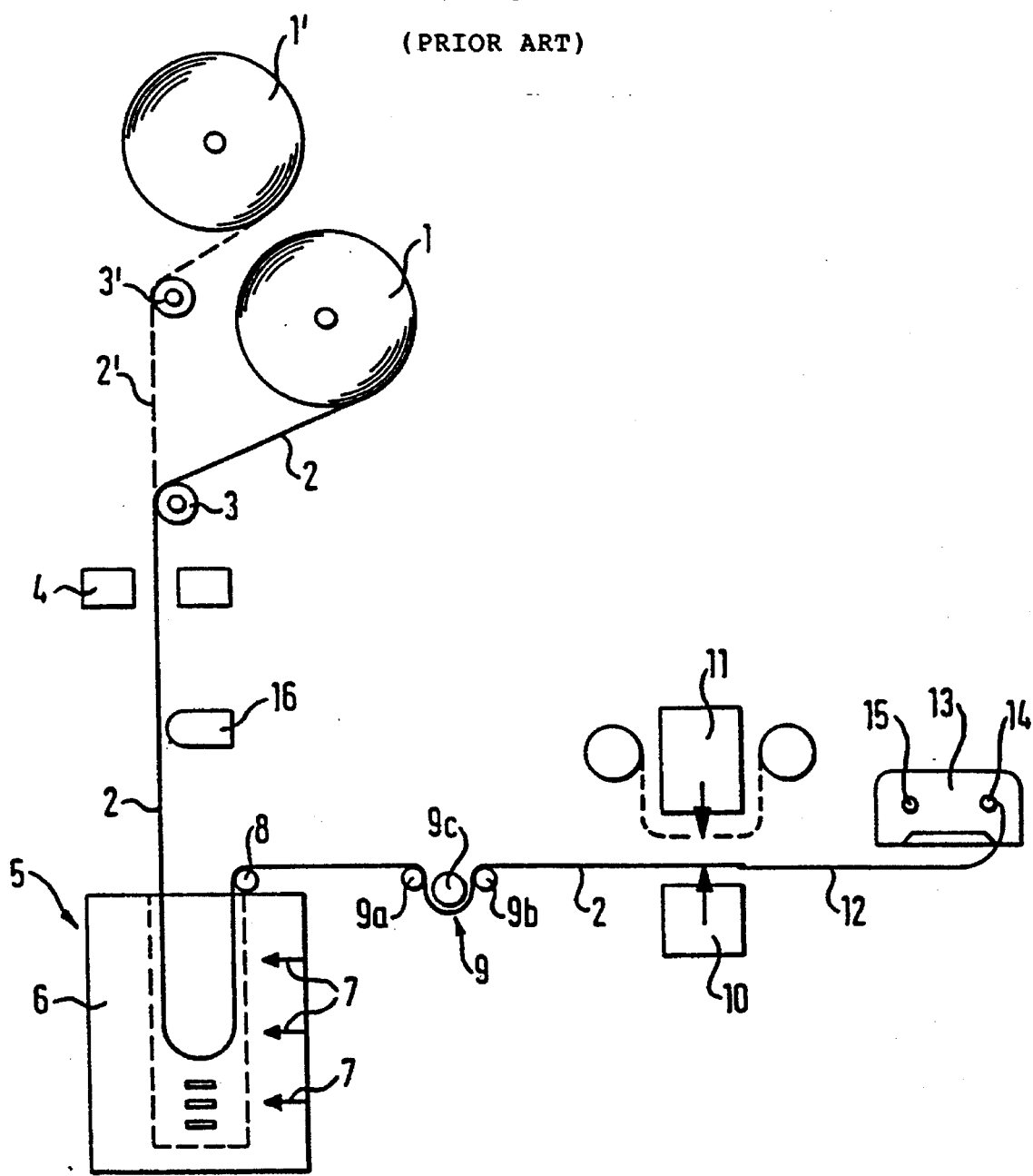
FIG. 1 is a schematic illustration of a conventional tailoring and winding machine for editing magnetic tapes impressed with a recording and packing them into cassettes.

Throughout all the Figures, the same or corresponding elements are always indicated by the same reference numerals.

Turning now to the drawing, and in particular to FIG. 1, there is shown a schematic illustration of a conventional tailoring and winding machine for editing magnetic tapes impressed with a recording and packing them into empty cassettes. The tailoring and winding machine includes one or preferably more supply reels 1, 1'. Wound on each supply reel 1, 1' is a long magnetic tape 2, 2' which is impressed with a series of identical copy recordings of a master separated from each other by preferably equally long pauses which contain the 6 Hz recorded cue tone signal. The magnetic tapes 2, 2' run from their supply reels 1, 1' via a respective guide pulley 3, 3' to a tape changing unit 4 which supplies either one of the magnetic tapes 2, 2' to a loading unit 5. The loading unit 5 includes a vacuum chamber 6 through which the selected magnetic tape, e.g. magnetic tape 2, is advanced in form of a loop, with the length of the loop in the vacuum chamber 6 being determined by the prevailing vacuum and monitored by means of photosensors 7.

The tape 2 leaves the vacuum chamber 6 via a guide pulley 8 and runs subsequently past a displacement pickup 9 in form of a guide pulley 9a at the inlet, a guide pulley 9b at the outlet and an engagement disk 9c between the guide pulleys 9a, 9b, with the revolution of the disk 9c being detected e.g. in inductive or optical fashion. In view of the frictional fit between the disk 9c and the magnetic tape 2, the disk 9c is caused to rotate.

Following the displacement pickup 9, the magnetic tape 2 runs through a cutting unit 10 which is opposed by a splicer 11 in order to splice a predetermined length of a cue tape, i.e. leader and trailer, to the magnetic tape 2 which is cut between two successive recordings. The cue tape is uncut and wound on the hubs 14, 15 of the still empty cassette shell 13 and at the beginning of each editing is partially pulled out and separated in a not shown conventional fashion from the cassette for subsequent splicing operation. During cutting and splicing works, the magnetic tape 2 is immobilized. The hub 14 is operatively connected to a not shown spooling motor by which the leader 12 and the following magnetic tape 2 is wound into the empty cassette, with the spooling motor of the take-off reel 1 (or 1') simultaneously advancing the magnetic tape 2 (or 2') to eliminate a stretching of the tape. Both spooling motors for the hub 14 and for the supply reel 1 or 1' are speed-controlled by photosensors which determine the position of the tape loop in the vacuum chamber 6. As soon as being passed by a complete recording, the cutting unit 10 is actuated again to cut the tape, with the splicer 11 splicing a trailer to the end of the magnetic tape 2. Thereafter, the packed cassette 13 is removed automatically from its assembly position, and a new blank cassette is automatically supplied for subsequent packing operation.

The cut of the magnetic tape 2 in the cutting unit 10 is triggered by the recording cue tone. The recorded cue tone is read via a read head 16 which is arranged upstream of the vacuum chamber 2 in order to allow sufficient time despite a high transport speed of the tape 2 for deceleration and stoppage of the tape after recognition of the cue tone.

At the start of the tailoring and packing process, that is before the automatic packing of the cassettes 13, a number of parameters of the tailoring and winding machine are determined and set. These parameters include the tape material compatible acceleration and deceleration of the magnetic tape, controlled by a suitable program, between a maximum tape speed of about 25 m/s and a tape speed of about 6 m/s for reading the cue tone and a braking to complete tape stoppage for cutting the tape. The concerned parameters are also dependent on the used blank cassettes, in particular on the construction of the guide pins and guide drums of the cassettes.

The control of the transport of the magnetic tape, especially acceleration and deceleration of the tape and control of the tape speed, is primarily dependent on the displacement pickup which measures the momentary tape speed. In view of the unavoidable slip between the tape and the disk 9c of the displacement pickup 9, the measured speed is always smaller than the actual speed. The difference between the actual speed and the measured speed changes with variations of the slip. For example, with increasing slip, the actual tape speed is increasingly greater than the speed detected by the displacement pickup 9. Thus, the time of deceleration is extended and the length of the magnetic tape running past the edit point until tape stoppage becomes greater so that the position of the edit point is shifted into the area of the recorded cue tone or even into the area of the subsequent recording, in which case, the subsequently packed cassette contains an incomplete recording. Further errors which affect the position of the edit point of the magnetic tape can be caused by an incorrect tape stoppage, a defective control of the spooling motors or by other electrical errors of the machine.

Figure 2:
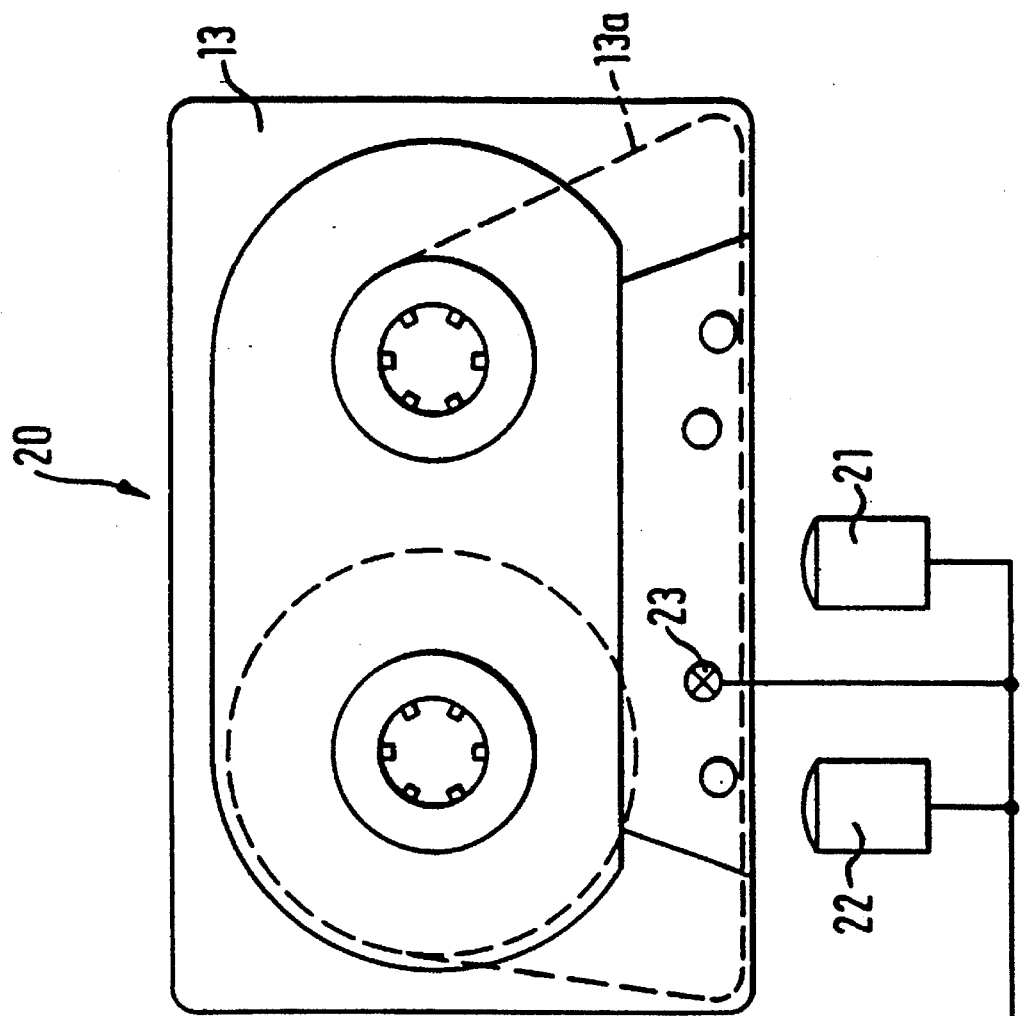
FIG. 2 is a schematic illustration of an apparatus according to the present invention for testing the position of an edit point between the magnetic tape and a cue tape in form of a leader spliced ahead of the recording or a trailer spliced after the recording.

Turning now to FIG. 2, there is shown a schematic illustration of an apparatus according to the present invention for testing the position of the cue tone between a magnetic tape impressed with a recording and packed in the cassette and a leader spliced to the beginning of the recording or a trailer spliced to the end of the recording. This apparatus is a tape machine, generally designated by reference numeral 20 for playback of cassettes 13 at standard running speed of 4.76 cm/s. The tape machine 20 includes an audio read head 21 located centrally in front of the cassette 13 and positionable in a known manner upon a magnetic tape 13a for reading the recording. Moreover, the tape machine 20 includes a read head 22 for reading the recorded cue tone on the magnetic tape 13a, which has a frequency of 6 Hz. The cue tone read head 22 is situated in tape travel direction ahead of the audio-read head 21 and faces the magnetic tape 13a for placement thereupon. Moreover, the tape machine 20 includes a light barrier 23 which scans the magnetic tape 13a, the trailer as well as leader and detects the transition between the leader and the trailer, on the one hand, and the magnetic tape, on the other hand, and thus the position of the edit point. The light barrier 23 is arranged between the audio-read head 21 and the cue tone read head 22 and is incorporated preferably in a positioning pin of the cassette. In case of a MC with a leader of sufficient transparency, the light barrier 23 has e.g. a light-emitting diode (LED) and a photodetector which receives light from the LED until the light beam is interrupted by the light impervious magnetic tape to generate a signal $S_v$ at the output of the light barrier 23. In case of a DCC, the light barrier 23 is preferably formed as reflection light barrier which utilizes the particular reflection behavior of the edit point for detection of the cue tone.

The cue tone read head 22 detects the track adjacent to the lower tape edge. Upon detection of the recorded cue tone on the magnetic tape 13a, the read head 22 generates an output signal $S_c$. In addition, the soundhead 22 causes on the previously defined tape side A or B that does not contain a recording of the cue tone, a magnetic shorting by which the stray field of a cue tone on a magnetic tape twisted by 180° about the longitudinal axis is weakened such that it becomes significantly smaller than the field which is generated by a cue tone detected in correct position and characterized by a significant fluctuation range. Through evaluating the signal amplitude of the cue tone, a reliable determination can thus be made as to whether the magnetic tape is in the correct position or, as frequently encountered during winding into the empty cassette, is twisted by 180° about the longitudinal axis during packing into the cassette. This evaluation can be executed through measuring of or through listening to the magnetic tape.

The evaluation of the signals $S_v$ and $S_c$ is carried out by a microprocessor M which is integrated in the tape machine 20 and displays the result of the evaluation in a display field 24.

The microprocessor M further includes a not shown memory which stores subsequently defined edit point zones to set a tolerance range for the timed distances established between the measured signals $S_v$ and $S_c$ as well as to set various inadmissible error regions outside the tolerance range. The edit point zones are dependent on the previously defined positions I to IV of the recording of the cue tone so that these positions are also stored in the memory and, as will be described furtherbelow, are used as parameters for the method according to the present invention.

The error messages which will be described in more detail hereinafter are indicated by the display 24.

Upon occurrence of error messages, the microprocessor M issues particular control signals in response to these error messages to automatically readjust the tailoring and winding machine of FIG. 1.

As the method according to the present invention is based on the detection of the cue tone and the edit point, it must be ensured that the detection of the respective signals $S_v$ and $S_c$ is executed at a same reaction time. The reaction time for detecting the cue tone by the read head 22 is however significantly greater than the reaction time for detecting the edit point by the light barrier 23. Therefore, the light barrier 23 is operatively connected to a subsequent delay element in order to compensate the different reaction times (which compensate each other in view of the difference between the signals as described hereinafter).

Figure 3:
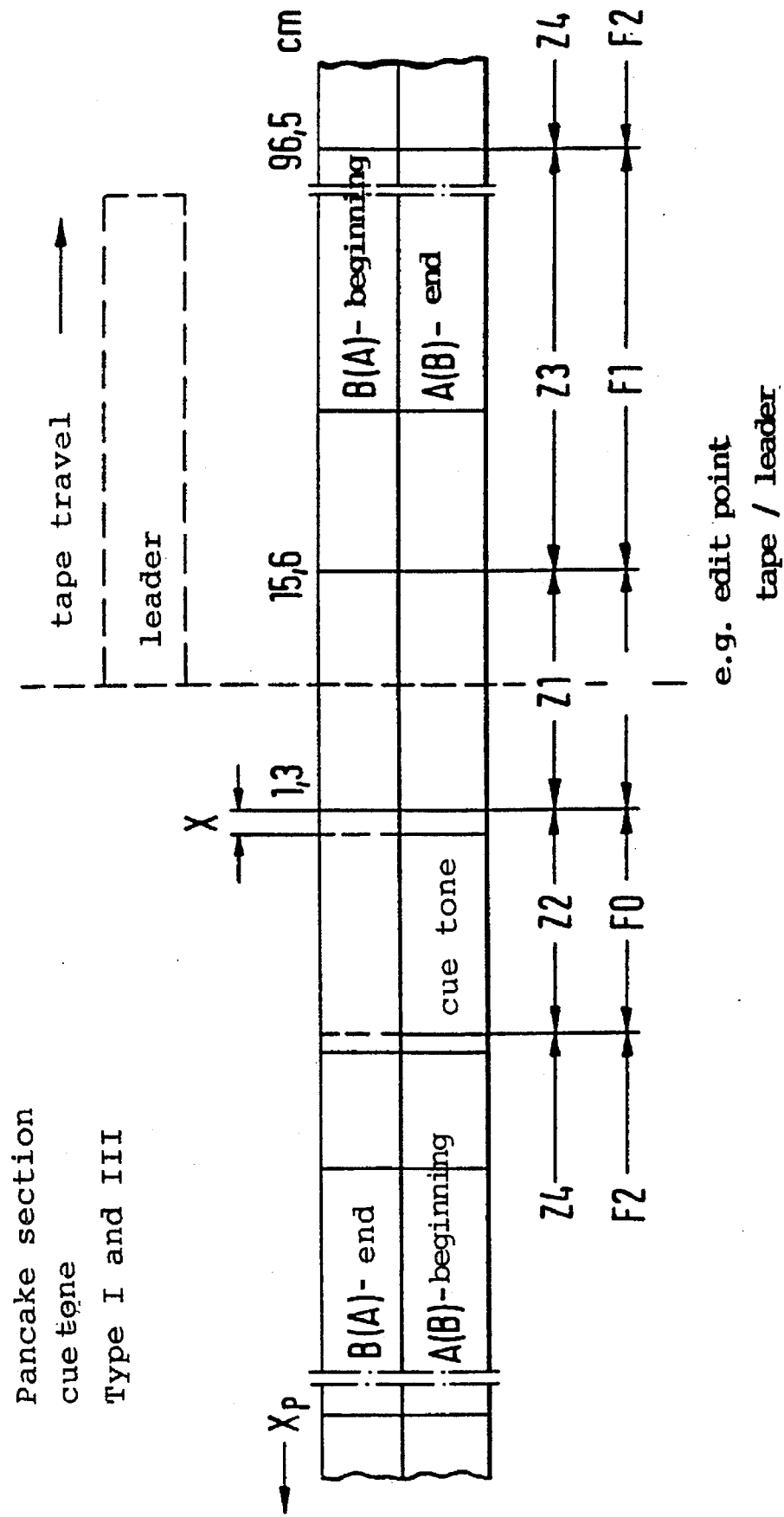
FIG. 3 is a schematic illustration of positions I and III of the recorded cue tone relative to the splice between the magnetic tape and the leader.

The method according to the invention for testing the edit point on the magnetic tape is now described in more detail for the positions I and III of the recorded cue tone with reference to FIG. 3 in connection with the graphical illustrations of FIGS. 4–7.

FIG. 3 shows the area of possible position of the edit point of the magnetic tape packed in a cassette with respect to the cue tone recorded at the beginning of the B side and A side of the tape, as defined by positions I and III. This area is divided in differently long zones Z1 to Z4 which adjoin each other continuously without gaps. Viewed in direction of tape travel, the zone Z3 forms the leading zone, followed by the zones Z1, Z2 and Z4. Only zone Z1 which is located directly ahead of the recorded cue tone defines an admissible tolerance range for the position of the cuts while the zones Z2, Z3 and Z4 define inadmissible sections for the cut, with error messages F0, F1, F2 being assigned to these zones Z2, Z3, Z4. The zones Z1 to Z4 and the error messages F0 to F3 are also stored in the memory of the tape machine 20.

The distance between the beginning of the recording of the cue tone and the end of the zones Z1 to Z4, as viewed in tape travel, corresponds in the amplitude/time plane of the measured signals $S_v$ and $S_c$ to the respective time difference $t_{vc}$ (V=leader end, C=cue tone) between the ascending flank of the signal $S_c$ and the descending flank of the signal $S_v$. The time difference $t_{vc}$ is dimensioned in seconds and positive when the cue tone signal $S_c$ outputted by the cue tone read head 22 occurs chronologically after the signal $S_v$ for indicating the edit point between the leader and the magnetic tape, which means that the recording of the cue tone is situated in tape travel direction after the tape edit point. When forming the time difference, it is to be noted that the cue tone read head 22 is positioned at a distance ahead of the light barrier 23 which detects the edit point i.e. the transition from the leader to the magnetic tape. This distance is assumed to be approximately 1.3 cm (=X in FIG. 3) so that the edit point is distanced from the beginning of the cue tone on the tape by 13 mm when the cue tone read head 22 and the light barrier 23 simultaneously output the measuring signals $S_v$ and $S_c$.

Figure 4A:
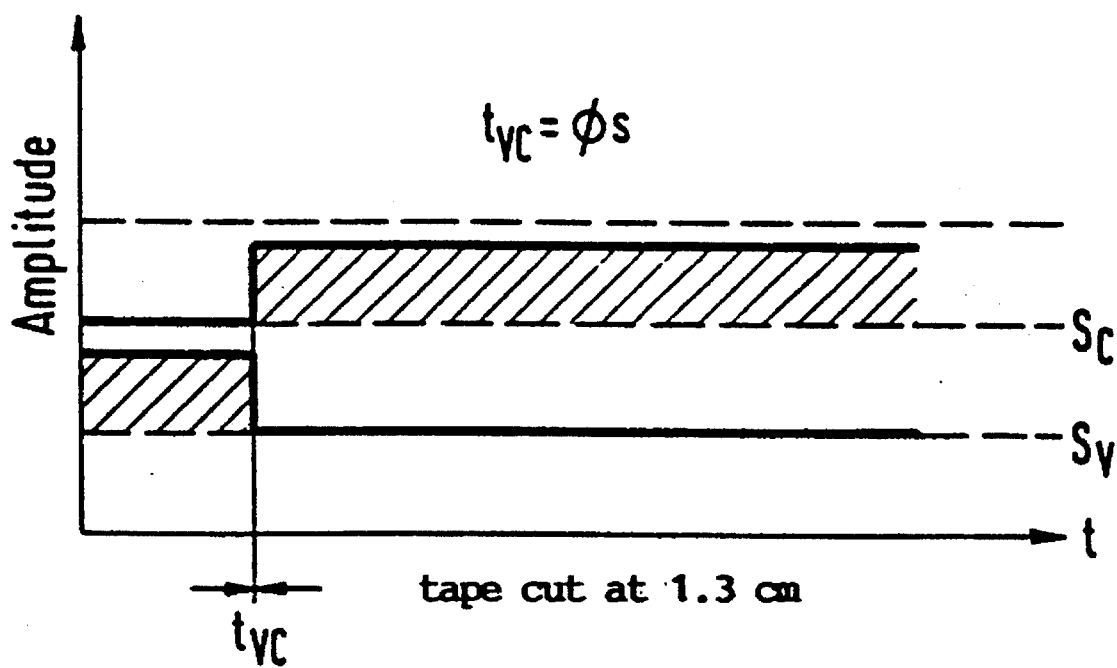
FIGS. 4a, 4b, 5a, 5b, 6 and 7 are graphical illustrations of time-dependent amplitudes in accordance with FIG. 3, illustrating various scenarios of the time difference between detected output signals commensurate with the recorded cue tone and the edit point.
Figure 4B:
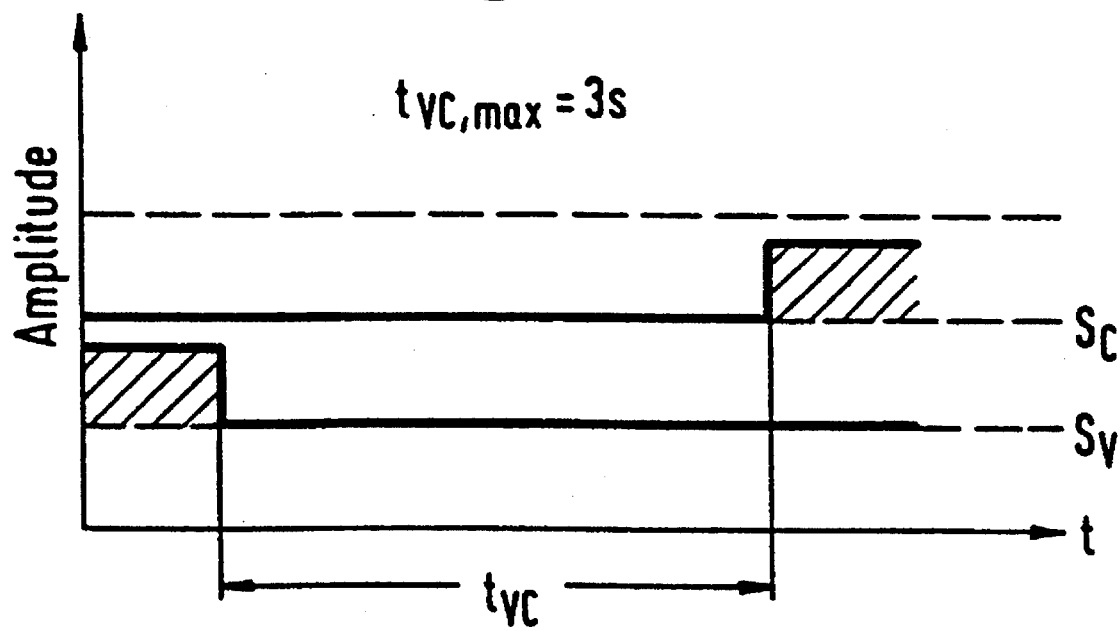

The edit point zone Z1 is defined as $0 \leq t_{vc} \leq 3$ s (see FIGS. 3, 4a, 4b).

At $t_{vc}$=0 s, the tape cut i.e. the edit point between the leader and the magnetic tape is located 13 mm before the beginning of the recorded cue tone in direction of the tape travel (FIG. 4a). At a time difference $t_{vc}$ of 3 s, the tape cut is located 155.8 mm before the beginning of the recorded cue tone (4.76 cm/s×3s+1.3 cm=15.6 cm, with 4.76 cm/s being the standard tape travel speed for tape cassettes), as shown in FIG. 4b.

As stated above, the edit point zone Z1 defines the admissible tolerance range for the position of the edit point in tape travel direction before the recorded cue tone. This admissible tolerance range is established by the manufacturer. As long as the values of $t_{vc}$ lie within the tolerance range, no error message will be displayed by the tape machine 20 and the process for packing the cassettes continues unimpeded.

The edit point zone Z2 is defined as $-0.273 \text{ s} \leq t_{vc} \leq 0$ s (see FIG. 3, FIGS. 5a–5c).

Figure 5A:
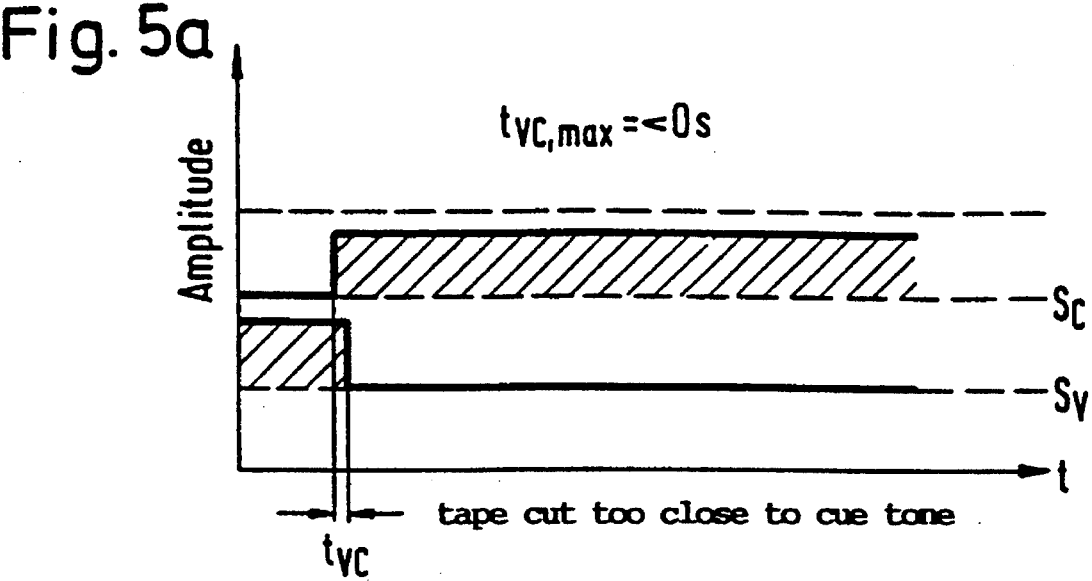
Figure 5B:
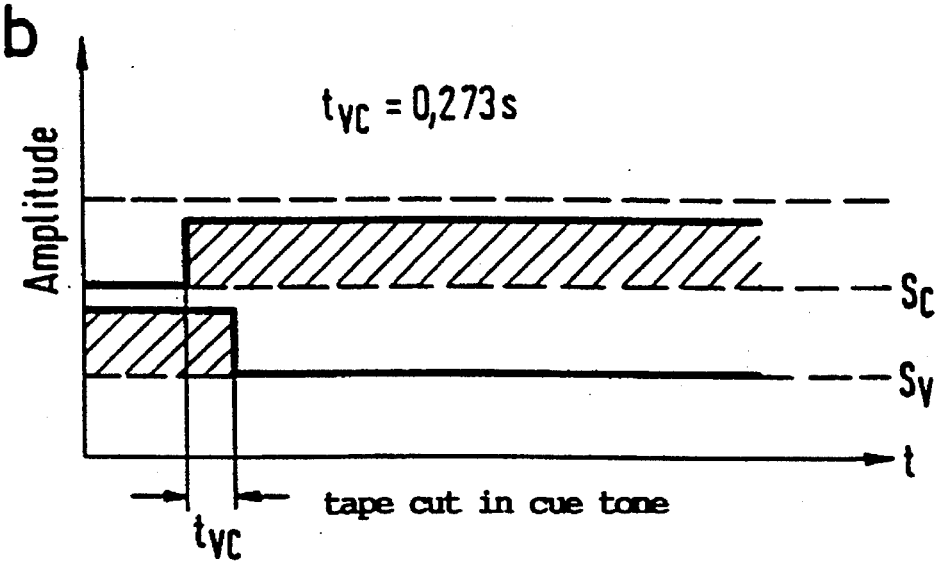
Figure 5C:
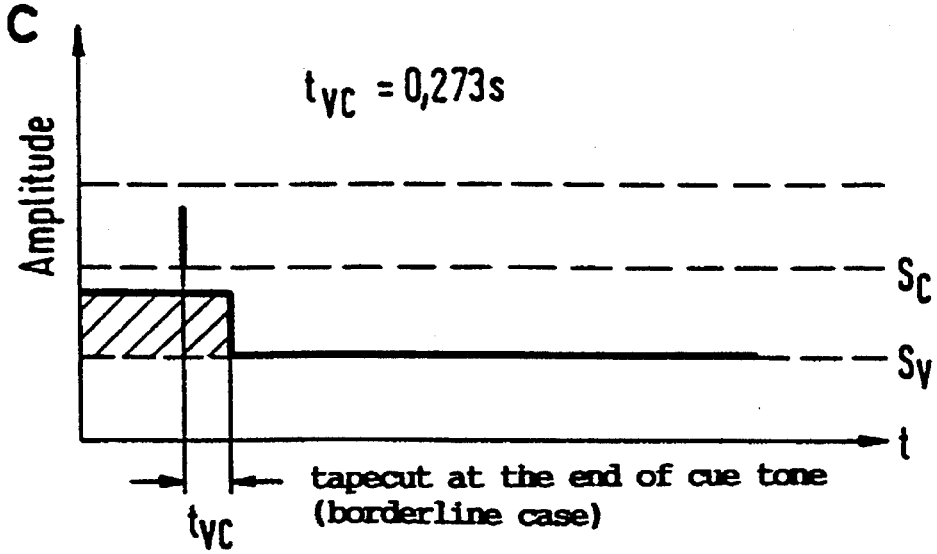

At $t_{vc}$< 0, the tape cut is situated between 0 mm and 12.9 mm in tape travel direction before the beginning of the recorded cue tone (FIG. 5a). At $t_{vc}$=−0.273 s, the tape cut is situated in the recorded cue tone because of the following equation:

$$t_{vc} = \frac{\text{Distance cue tone read head 22 to light barrier 23}}{\text{tape speed}} = \frac{1.3 \text{ cm}}{4.76 \text{ cm/s}} = 0.273 \text{ s}$$

which governs as long as the tape cut is situated in the recorded cue tone. However, in case the recording of the cue tone is increasingly cut off and thus shorter, the signal $S_c$ is reduced to only a signal peak in the borderline case, as shown in FIG. 5c. In order to enable a detection of the recorded cue tone, at least one signal oscillation is required (indicated in FIG. 3 schematically at S), wit the detection range for a single oscillation amounting to $$\frac{(4.76 \text{ cm/s})}{(6 \text{ Hz})} = 0.79 \text{ cm} \approx 0.8 \text{ cm}.$$

In case the ascending signal flank of the cue tone signal $S_c$ is not detectable any more, the transition is shifted into the zone Z4 described in more detail furtherbelow.

The edit point zone Z2 corresponds thus to a tape cut in the range of maximum 12.9 mm before the beginning of the cue tone until its commencement on the tape and until its end. For this case, the tape machine 20 indicates the error code F0 in the display field 24.

Figure 6:
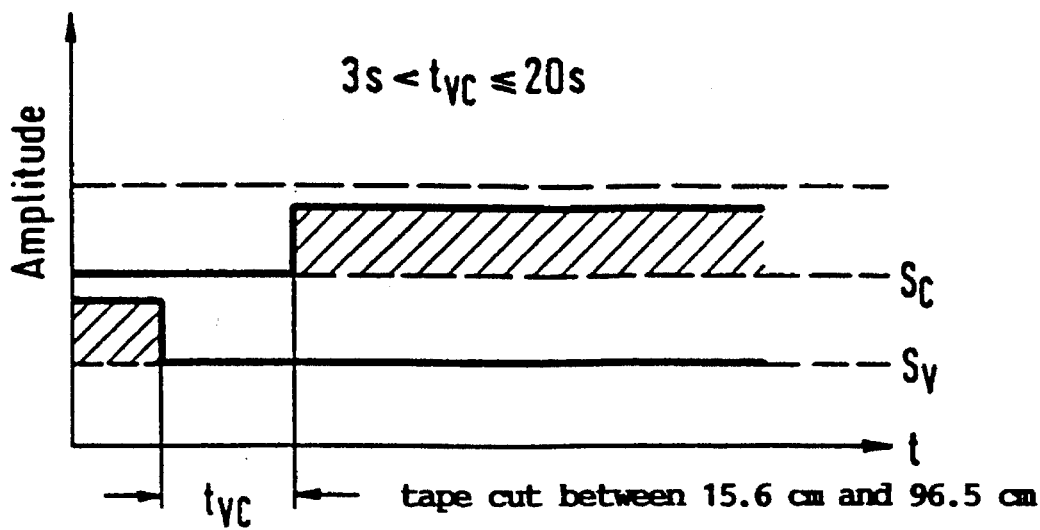

The edit point zone Z3 is defined as $3s < t_{vc} < t_{max}$ (see FIGS. 3 and 6).

At $t_{vc}$>3 s to $t_{max}$ (for example 20 s), the tape cut lies in tape travel direction in a range of 15.6 to 96.5 cm before the recorded cue tone. The edit point zone Z3 thus characterizes the inadmissible range in which the cut is shifted in tape travel direction far ahead of the beginning of the recorded cue tone and possibly even into the recording itself which belongs to the previously edited magnetic tape. The tape machine 20 thus indicates the error code F1 in the display field 24.

Figure 7:
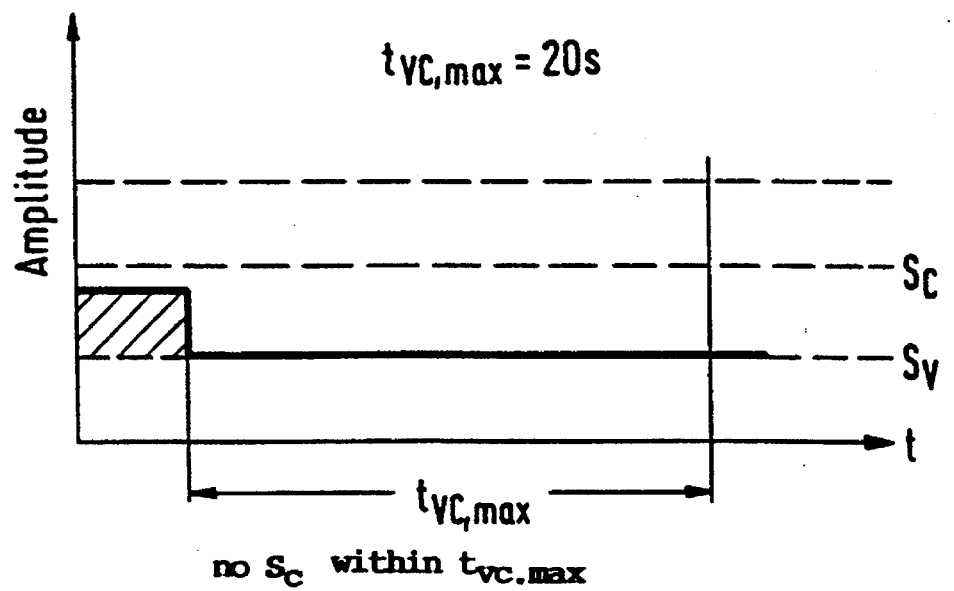

The edit point zone Z4 is defined by the failure of the cue tone soundhead 22 to detect a recording of a cue tone and thus is unable to transmit a signal $S_c$ (see FIGS. 3 and 7).

In case of the edit point zone Z4, the tape cut lies in tape travel direction behind the cue tone and thus in a worst case scenario in the effective recording of the actually checked cassette. The cue tone that triggered this tape cut lies on the tape of the previously packed cassette. This situation most likely continues to the subsequently packed cassettes. The edit point zone Z4 is thus characterized in that the signal $S_c$ for recording the cue tone on the tape of the actually checked cassette can be determined after detection of the signal $S_v$ for the tape cut only in a range greater than $X_P$. Since it is not in compliance with the test to playback the entire tape until the recorded cue tone at the tape end is reached, the "search" for the recorded cue tone is carried out only up to a point $X_P$ behind the edit point. $X_P$ designates a variably adjustable measuring limit (for example 20 s). In the event of 20 seconds, $X_P$ is thus situated in travel direction behind the signal $S_v$ by 96.5 cm.

A tape cut in the zone Z4 is confirmed by the display 24 with the error code F2.

The following description refers to the method according to the invention for testing the edit point on the magnetic tape for the positions II and IV of the recorded cue tone with reference to FIG. 8 in connection with the graphical illustrations of FIGS. 9 to 12.

FIG. 8 shows the area of the possible position of the edit point of the magnetic tape packed in a cassette with respect to the cue tone recorded at the end of the B side and A side of the tape in correspondence to the positions II and IV. This area is divided in differently long zones Z5 to Z8 which adjoin each other continuously without gaps. Viewed in direction of tape travel, the zone Z8 forms the leading zone, followed by the zones Z6, Z5 and Z7. Only zone Z5 which is located directly behind the recorded cue tone defines an admissible tolerance range for the position of the cuts while the zones Z6, Z7 and Z8 define inadmissible sections for the cut, with error messages F4, F5, F6 being assigned to these zones Z6, Z7, Z8. The zones Z6 to Z8 and the error messages F4 to F6 are also stored in the memory of the tape machine 20.

Before commencing the determination of the edit point, the magnetic tape is wound up in tape travel direction to a point $Y_P$ (in the area of the effective recording or within the effective recording) before the edit point. The position of the point $Y_P$ is adjustable and lies for example 96.5 cm—according to a tape travel time of 20 s at standard tape speed of 4.76 cm/s—in tape travel direction ahead of the signal $S_v$.

The distance between the end of the recording of the cue tone and the beginning of the trailer (edit point zone Z5) corresponds—as viewed respectively in tape travel direction—in the amplitude/time plane of the measured signals $S_v$ and $S_c$ to the respective time difference $t_{EN}$ (E=end of the cue tone, N=beginning of trailer) between the descending flank of the signal $S_c$ and the ascending flank of the signal $S_v$. The time difference $t_{EN}$ is dimensioned in seconds and positive when the cue tone $S_c$ outputted by the cue tone read head 22 occurs chronologically before the signal $S_v$ for indicating the transition between the magnetic tape and the trailer so that in tape travel direction the recording of the cue tone lies before the edit point. When forming the time difference, it is to be noted that the cue tone read head 22 is positioned at a distance ahead of the light barrier 23 which detects the edit point i.e. the transition from the trailer to the magnetic tape. This distance is also assumed to be approximately 1.3 cm (=Y in FIG. 8) so that the edit point is distanced from the end of the cue tone on the tape by 13 mm when the cue tone read head 22 and the light barrier 23 output the measuring signals $S_v$ and $S_c$ at a time difference of 0.546 s (see $t_{EN}$ in FIG. 9a).

Figure 9A:
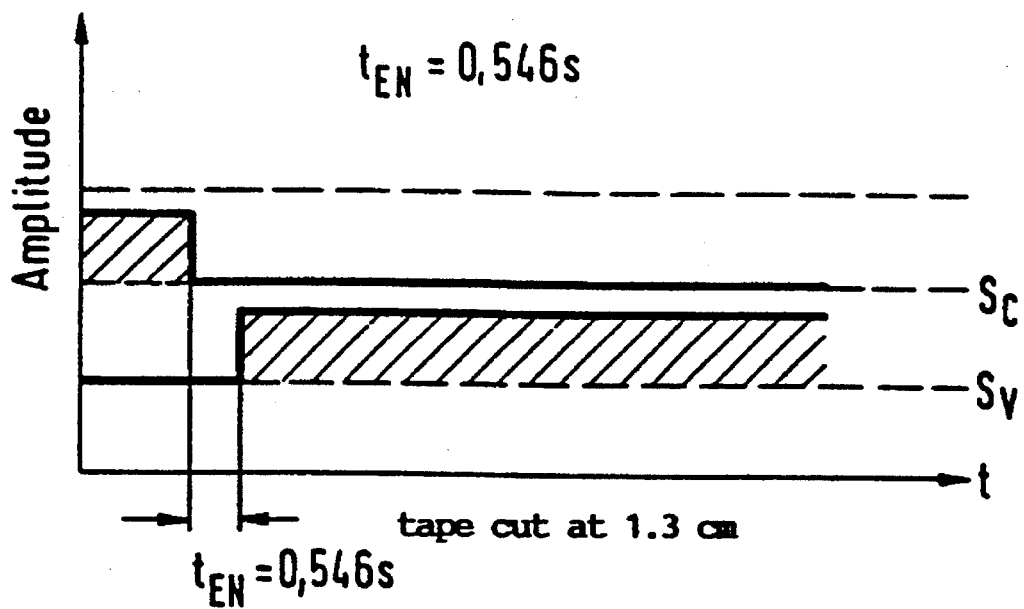
Figure 9B:
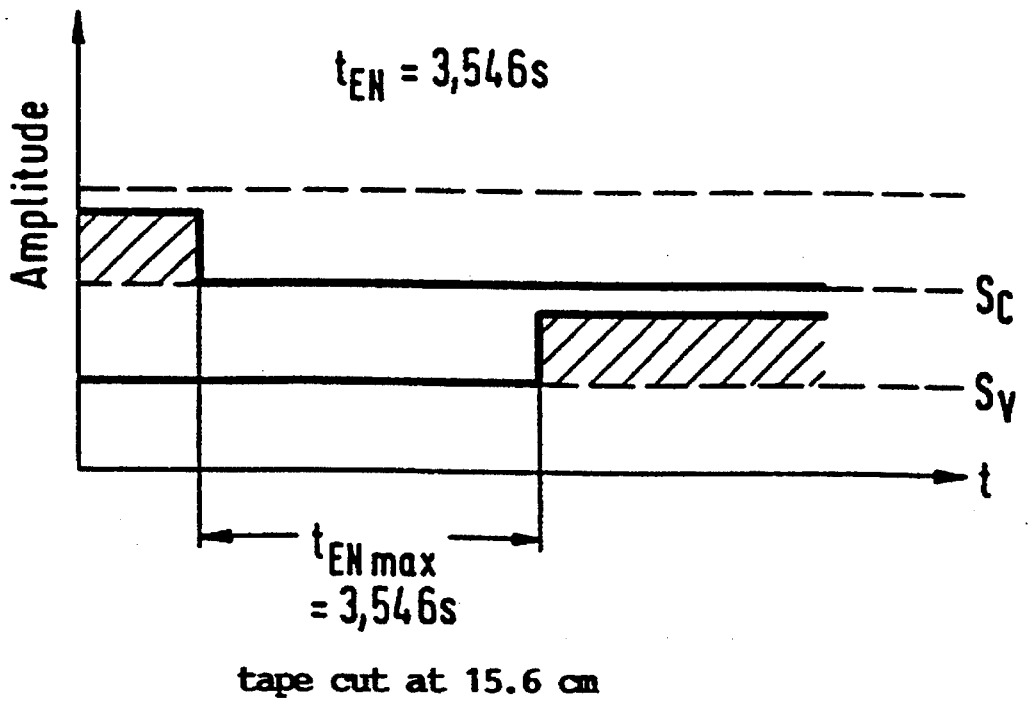

The edit point zone Z5 is defined as $0.546 \text{ s} \leq t_{EN} \leq 3.546$ s (see FIGS. 8, 9a, 9b).

At $t_{EN}=0.546$ s, the tape cut, i.e. edit point, is situated 13 mm in tape travel direction behind the end of the cue tone (FIG. 9a). At a time difference $t_{EN}=3.546$ s, the tape cut is situated in tape travel direction 155.8 mm behind the end of the cue tone (4.76 cm/s×3.546 s−1.3 cm=15.6 cm), as shown in FIG. 9b.

As stated above, the edit point zone Z5 defines the admissible tolerance range for the edit point in tape travel direction behind the recorded cue tone. This admissible tolerance range is established by the manufacturer. As long as the values of $t_{EN}$ lie within the tolerance range, no error message will be displayed by the tape machine 20 and the process for packing the cassettes continues unimpeded.

The edit point zone Z6 is defined as $0.273 \text{ s} < t_{EN} < 0.546$ (see FIGS. 8, 10a to 10c).

At $t_{EN}<0.546$ s, the tape cut lies between 0 mm and 12.99 mm in tape travel direction behind the end of the recorded cue tone (FIG. 10a). At $t_{EN}=+0.273$ s, the tape cut lies within the recorded cue tone. Because of the particular position of the tape cut in the recorded cue tone, reference is made to the previous description with regard to the positions I and III of the recorded cue tone (see edit point zone Z2 for these positions of the recorded cue tone including the borderline case mentioned there).

Thus, the edit point zone Z6 corresponds to a tape cut outside the tolerance range. This situation is indicated by the display 24 of the tape machine 20 with the error code F4.

Figure 11A:
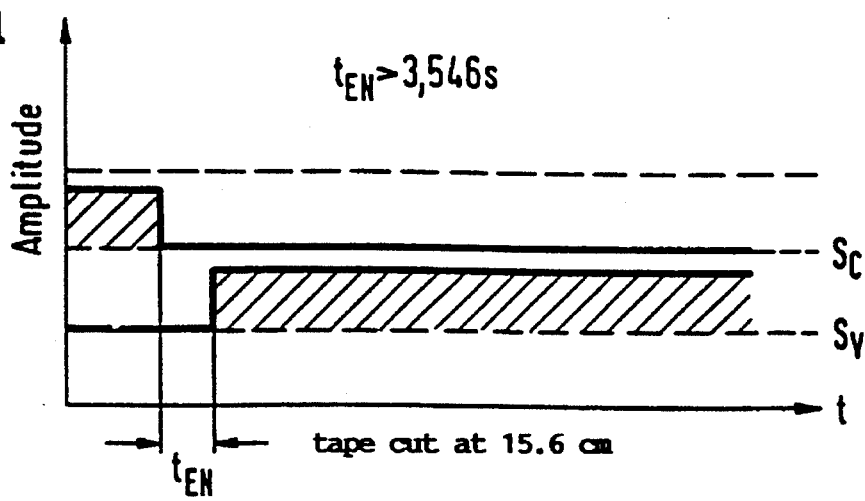
Figure 11B:
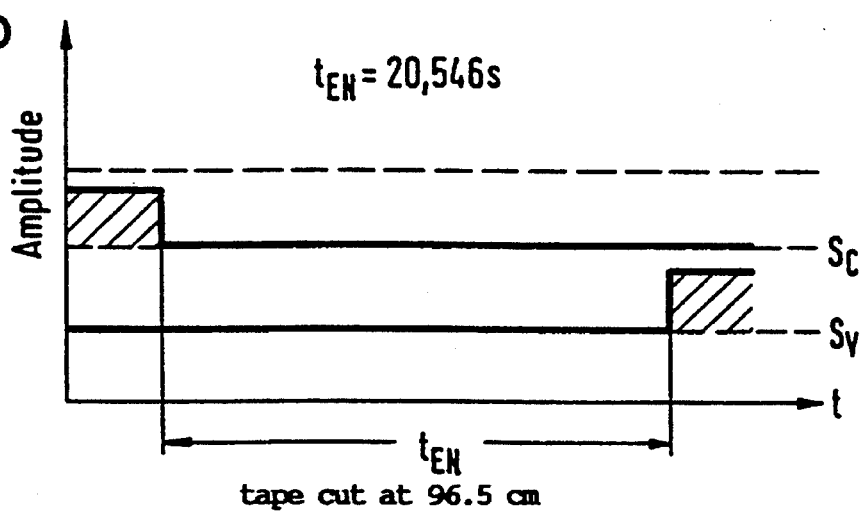

The edit point zone Z7 is defined as $3.546 \text{ s} < t_{EN} < t_{max}$ (see FIGS. 8, 11a, 11b).

At $t_{EN}>3.546$ s to 20.546 s, the tape cut lies in travel direction of the magnetic tape behind the end of the recorded cue tone. This results in a length for the range of the edit point zone of 15.6 to 96.5 cm.

The edit point zone Z7 thus characterizes a position of the edit point outside the tolerance range. The edit point is situated in playback direction of the magnetic tape far behind the recorded cue tone and reaches into the data information of the subsequently edited tape. This situation is indicated by the display 24 of the tape machine 20 with the error code F5.

Figure 12:
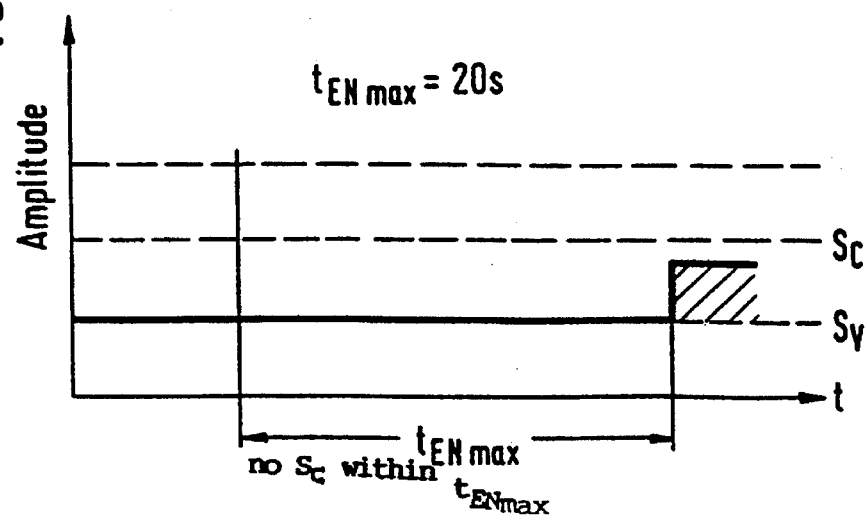

The edit point zone Z8 is characterized by the failure to detect the signal $S_c$ (FIGS. 8 and 12). The tape cut lies in this case in travel direction of the magnetic tape before the position at which the cue tone would commence.

In case of the edit point zone Z8, the tape cut lies in tape travel direction ahead of the cue tone and thus in a worst case scenario in the effective recording of the actually checked cassette. The cue tone which triggers this tape cut is recorded on the tape of the subsequently packed cassette. This situation most likely continues to the subsequently packed cassette. The edit point zone Z8 is thus characterized by the fact that only the trailer follows the tape of the actually checked cassette after detection of the signal $S_v$.

A tape cut in the zone Z8 is confirmed in the display 24 by the error code F6.

Through the method according to the invention, an incorrect position of the edit point with respect to the positions I to IV of the cue tone is differentiated and displayed through outputting error signals F0 to F6. These error signals enable a manual readjustment or shut down of the tailoring and winding machine to eliminate the error (= setting of a tolerable edit point). Alternatively, the error signals can be converted into control signals. Whether manually controlled or automatically on line, the method according to the invention allows elimination of edit point errors in a shortest possible time without experiencing any greater production losses.

In case of the error messages F2 (edit point zone Z4) and F6 (edit point zone Z8), tests should be carried out in a manner as described above as to whether the tape is correctly wound into the cassette in order to ensure that the failure of detecting a cue tone is not caused by a reeled tape which is twisted by 180° about its longitudinal axis.

While the invention has been illustrated and described as embodied in a method of and apparatus for testing the position of an edit point on edited magnetic tapes packed in cassettes, it is not intended to be limited to the details shown since various modifications and structural changes may be made without departing in any way from the spirit of the present invention.

What is claimed as new and desired to be protected by Letters Patent is set forth in the appended claims:

1. Method of testing the position of an edit point between an edited magnetic tape impressed with a recording and packed in a cassette during a tailoring and winding process and a leader spliced ahead of the recording or a trailer spliced after the recording, comprising the steps of:

playing the cassette substantially at a standard playing time;

determining a distance of the edit point from a cue tone recorded at least before the beginning of the recording or from the beginning of the recording, or from a cue tone recorded at least behind the recording or from the end of the recording;

generating a first output signal commensurate with an optical measurement of the edit point;

generating a second output signal commensurate with an inductive measurement of the recorded cue tone;

determining in dependence of the position of the recorded cue tone behind the leader or ahead of the trailer as viewed in tape travel direction,
  a) a time difference between a ascending flank of the second output signal and a descending flank of the first output signal, or
  b) a time difference between the ascending flank of the first output signal and the descending flank of the second output signal;

comparing either one of the time differences with upper and lower limits which define a tolerance range for the time difference and for the position of the edit point before or behind the recorded cue tone as viewed in tape travel direction; and producing error messages when either one of the time differences and thus the position of the edit point falls on any one of the following events: a) outside the tolerance range in the recorded cue tone, b) before the tolerance range, c) behind the tolerance range d) behind and e) before the recorded cue tone.

2. The method of claim 1 wherein said producing step includes optically displaying the error messages.

3. The method of claim 1 wherein said producing step includes converting the error messages in signals interrupting the tailoring and winding process.

4. The method of claim 1 wherein said producing step includes converting the error messages in signals readjusting the tailoring and winding process.

5. The method of claim 1 wherein said playing step includes randomly picking a cassette for testing and transferring the cassette to a tape machine automatically during running tailoring and winding process.

6. A method of testing the position of an edit point between a magnetic tape impressed with a recording and packed in a cassette and a cue tape spliced to the magnetic tape, comprising the steps of:

determining a distance of the edit point from the cue tone recorded on the magnetic tape;

generating a first output signal commensurate with an optical measurement of the edit point;

generating a second output signal commensurate with an inductive measurement of the recorded cue tone;

determining a time difference between a triggering of the first output signal and the second output signal;

comparing the time difference with a tolerance range in which the position of the edit point is acceptable with respect to the recorded cue tone; and producing an error message when the time difference and thus the position of the edit point is outside the tolerance range.

7. Apparatus for testing the position of an edit point between an edited magnetic tape impressed with a recording and packed in a cassette and a leader spliced ahead of the recording or a trailer spliced after the recording, comprising:

a tape drive for running the cassette;

a light barrier for generating a first output signal commensurate with a position of the edit point;

a special read head for generating a second output signal in response to a detection of a cue tone;

a microprocessor operatively connected to said light barrier and said read head for processing and evaluating the first and second output signals by determining the time difference between the triggering of the first output signal and the triggering of the second output signal and controlling the tape drive in dependence of the determined time difference; and a display unit operatively connected to said microprocessor for indicating the result as determined by said microprocessor.

8. The apparatus of claim 7, further comprising a soundhead arranged in succession to said special soundhead for reading recorded data.

9. The apparatus of claim 7 wherein said light barrier is incorporated in a cassette positioning pin of the cassette.

10. The apparatus of claim 7 wherein said tape drive is a MC tape drive, said light barrier being a transparent light barrier.

11. The apparatus of claim 7 wherein said tape drive is a DCC tape drive, said light barrier being a reflection light barrier.

12. The apparatus of claim 7 wherein said microprocessor includes a control output for outputting a control signal upon occurrence of an error message.

13. The apparatus of claim 7, further comprising a time element initiated upon termination of the testing operation of a cassette and connected to said display unit via which the time passing since termination of the testing operation is displayed.

14. Use of an apparatus for testing the position of an edit point between an edited magnetic tape impressed with a recording and packed in a cassette and a leader spliced ahead of the recording or a trailer spliced after the recording, said apparatus being of a type having a tape drive for running the cassette, a light barrier for generating a first output signal commensurate with a position of an edit point, a special read head for generating a second output signal in response to a detection of a cue tone, a microprocessor operatively connected to the light barrier and the read head for processing and evaluating the output signals of the light barrier and of the special read head by determining the time difference between the triggering of the first output signal and the triggering of the second output signal and controlling the tape drive in dependence of the determined time difference, and a display unit operatively connected to the microprocessor for indicating the result as determined by said microprocessor, said apparatus being adapted for readjusting a tailoring and winding machine for packing a recorded magnetic tape into a MC or DCC cassette housing upon occurrence of at least one error message through triggering of a control signal or shut-off signal.

15. Use of an apparatus for testing the position of an edit point between an edited magnetic tape impressed with a recording and packed in a cassette and a leader spliced ahead of the recording or a trailer spliced after the recording, said apparatus being of a type having a tape drive for running the cassette, a light barrier for generating a first output signal commensurate with a position of an edit point, a special read head for generating a second output signal in response to a detection of a cue tone, a microprocessor operatively connected to the light barrier and the read head for processing and evaluating the output signals of the light barrier and of the special read head by determining the time difference between the triggering of the first output signal and the triggering of the second output signal and controlling the tape drive in dependence of the determined time difference, and a display unit operatively connected to the microprocessor for indicating the result as determined by said microprocessor, said apparatus being adapted for on-line monitoring of a tailoring and winding machine for packing a recorded magnetic tape into a MC or DCC cassette housing and adjusting the tailoring and winding machine upon occurrence of at least one error message.

* * * * *